US010703232B2

(12) United States Patent
Matsui et al.

(10) Patent No.: US 10,703,232 B2
(45) Date of Patent: Jul. 7, 2020

(54) VEHICLE SEAT

(71) Applicant: TACHI-S CO., LTD., Akishima-shi, Tokyo (JP)

(72) Inventors: Takashi Matsui, Akishima (JP); Takashi Yokoyama, Akishima (JP)

(73) Assignee: TACHI-S CO., LTD., Akishima-shi (JP)

( * ) Notice: Subject to any disclaimer, the term of this patent is extended or adjusted under 35 U.S.C. 154(b) by 70 days.

(21) Appl. No.: 16/316,411

(22) PCT Filed: Apr. 5, 2017

(86) PCT No.: PCT/JP2017/014209
§ 371 (c)(1),
(2) Date: Jan. 9, 2019

(87) PCT Pub. No.: WO2018/016137
PCT Pub. Date: Jan. 25, 2018

(65) Prior Publication Data
US 2019/0232829 A1 Aug. 1, 2019

(30) Foreign Application Priority Data
Jul. 20, 2016 (JP) .................. 2016-142572

(51) Int. Cl.
B60N 2/30 (2006.01)
B60N 2/58 (2006.01)

(52) U.S. Cl.
CPC ............ B60N 2/309 (2013.01); B60N 2/30 (2013.01); B60N 2/3047 (2013.01); B60N 2/58 (2013.01)

(58) Field of Classification Search
None
See application file for complete search history.

(56) References Cited

U.S. PATENT DOCUMENTS 4,047,756 A * 9/1977 Ney ......................... B60N 2/58
297/219.1
4,772,070 A * 9/1988 Leto, Jr. .................. B60N 2/60
297/218.1

(Continued)

FOREIGN PATENT DOCUMENTS

DE 102007042596 A1 * 3/2009 .......... B60N 2/3013
DE 102010010403 A1 9/2011

(Continued)

OTHER PUBLICATIONS

Notification of Transmittal of Copies of Translation of the International Preliminary Report on Patentabililty (Form PCT/IB/326) issued in counterpart International Application No. PCT/JP2017/014209 dated Jan. 31, 2019 with Forms PCT/IB/373, PCT/ISA/237, and PCT/IB/338, with English translation (13 pages).

(Continued)

Primary Examiner — David E Allred
(74) Attorney, Agent, or Firm — Westerman, Hattori, Daniels & Adrian, LLP

(57) ABSTRACT

Provided is a vehicle seat (1) capable of facilitating the mounting of a cover (30). The cover (30) of a seat cushion (2) is configured such that a upper portion cover (31) is disposed on the upper surface side of the seat cushion (2), a front portion cover (33) extends from the front edge of the upper portion cover (31) to the rear surface side of the seat cushion (2), and a rear portion cover (34) extends from the rear edge of the upper portion cover (31) to the rear surface side of the seat cushion (2). A first link portion (44) which detachably couples the rear edge of the front portion cover (33) and the front edge of the rear portion cover (34) to each other contacts a lower portion pad (22) of a cushion pad (20).

4 Claims, 8 Drawing Sheets

(56) References Cited

U.S. PATENT DOCUMENTS

| | | | | |
|---|---|---|---|---|
| 5,023,125 A * | 6/1991 | Gray | B60N 2/5833 | 150/158 |
| 5,234,252 A * | 8/1993 | Wallach | B60N 2/6036 | 297/220 |
| 5,326,151 A * | 7/1994 | Smith | B60N 2/5883 | 297/218.4 |
| 6,241,188 B1 * | 6/2001 | Simpson | B60N 2/6027 | 244/122 R |
| 6,357,789 B1 | 3/2002 | Harada et al. | | |
| 7,677,661 B1 * | 3/2010 | Ferrari-Cicero | B60N 2/2812 | 297/219.12 |
| 8,556,337 B1 * | 10/2013 | Cornitius-Cary | A47C 7/021 | 224/275 |
| 2002/0043834 A1 * | 4/2002 | Jackson | A47C 31/11 | 297/228.1 |
| 2004/0100114 A1 * | 5/2004 | Rhodes | B60N 2/3075 | 296/65.09 |
| 2004/0104590 A1 * | 6/2004 | Kikuchi | B60N 2/309 | 296/65.03 |
| 2009/0160230 A1 | 6/2009 | Yasuda | | |
| 2009/0273211 A1 * | 11/2009 | Hancock | B60N 2/3018 | 297/13 |
| 2009/0322134 A1 * | 12/2009 | Yamada | B60N 2/3013 | 297/324 |
| 2010/0176635 A1 * | 7/2010 | Glance | B60N 2/753 | 297/255 |
| 2011/0309650 A1 * | 12/2011 | Seibold | B60N 2/309 | 296/65.01 |
| 2012/0169099 A1 * | 7/2012 | Horiguchi | B60N 2/307 | 297/314 |
| 2012/0292976 A1 * | 11/2012 | Ursino | B60N 2/5891 | 297/452.48 |
| 2013/0113241 A1 * | 5/2013 | Tsuchiya | B60N 2/5825 | 297/188.04 |
| 2013/0270887 A1 * | 10/2013 | Matsumoto | B60N 2/986 | 297/452.34 |
| 2015/0084360 A1 * | 3/2015 | Mueller | B60N 2/3047 | 296/37.5 |
| 2015/0115680 A1 * | 4/2015 | Mabashi | B60N 2/68 | 297/334 |
| 2017/0021746 A1 * | 1/2017 | Akutsu | B60N 2/3031 | |
| 2017/0055723 A1 * | 3/2017 | Johnston | C08J 5/00 | |
| 2017/0367491 A1 * | 12/2017 | Reaves | A47G 9/06 | |
| 2018/0154805 A1 * | 6/2018 | Imayou | B60N 2/3065 | |
| 2018/0281647 A1 * | 10/2018 | Murata | A47C 7/18 | |

FOREIGN PATENT DOCUMENTS

| | | | | |
|---|---|---|---|---|
| EP | 1400400 A2 * | 3/2004 | | B60N 2/203 |
| EP | 2075156 A2 | 7/2009 | | |
| JP | 2001-180352 A | 7/2001 | | |
| JP | 2002-87130 A | 3/2002 | | |
| JP | 3798132 B2 | 7/2006 | | |
| JP | 2009-153560 A | 7/2009 | | |
| JP | 2016-97276 A | 5/2016 | | |
| JP | 2016-97947 A | 5/2016 | | |
| WO | WO-2014104353 A1 * | 7/2014 | | B60N 2/305 |
| WO | 2016/084757 A1 | 6/2016 | | |
| WO | 2016/084766 A1 | 6/2016 | | |
| WO | WO-2017047156 A1 * | 3/2017 | | B60N 2/3075 |

OTHER PUBLICATIONS

International Search Report dated Jun. 20, 2017, issued in counterpart application No. PCT/JP2017/014209 (2 pages).

Written Opinion in Japanese dated Jun. 20, 2017, issued in counterpart application No. PCT/JP2017/014209 (4 pages).

* cited by examiner

VEHICLE SEAT

TECHNICAL FIELD

The present invention relates to a vehicle seat. In particularly, the present invention relates to a vehicle seat to which a cover can be easily attached.

BACKGROUND ART

The vehicle seat includes a seat cushion on a surface of which an occupant sits down and a seatback becoming a backrest for the occupant. The seat cushion supports a cushion pad in a frame and is formed by covering the cushion pad through the cover.

Conventionally, among the covers of the seat cushion for the vehicle seat, there is a cover in which it is provided on an upper surface of the seat cushion a soft trim cover (upper portion cover) formed from fabric, synthetic leather or leather and it is provided on a lower side of the seat cushion a hard bottom cover (lower portion cover) formed from a press molded product of synthetic resin (Patent Literature 1). Although the upper portion cover receiving weight of the occupant contacts with the cushion pad over longitudinal direction, it is formed a predetermined space between the lower portion cover not directly receiving weight by sitting down and the cushion pad.

CITATION LIST

Patent Literature

[Patent Literature 1]
Japanese Patent No. 3798132

SUMMARY OF INVENTION

Technical Problem

However, according to the prior art technology mentioned in the above, in a case that the cover is constituted by mutually linking both ends of the soft lower portion cover continuing from each of front and rear edges of the upper portion cover, it becomes difficult to attach the cover to the cushion pad. This is because the lower portion cover floats, thus cannot be stabled due to the space formed between the lower portion cover and the cushion pad when the both ends of the lower portion cover are mutually linked.

The present invention has been accomplished to solve the above problem. The present invention has an object to provide a vehicle seat to which a cover can be easily attached.

Solution to Problem

To accomplish the object, a vehicle seat according to the present invention comprising:
a frame supported by a support leg against a floor surface;
a cushion pad supported to the frame each portion of which is integrally formed;
a seat cushion having a cover covering the cushion pad; and
a seatback arranged at a rear end of the seat cushion;
wherein the cushion pad comprises:
an upper portion pad provided at an upper surface side of the frame; and
a lower portion pad provided at at least a front end side of a lower surface side of the frame;
wherein the cover comprises:
an upper portion cover provided on an upper surface side of the seat cushion;
a front portion cover extending to a rear surface side of the seat cushion from a front edge of the upper portion cover;
a rear portion cover extending to the rear surface side of the seat cushion from a rear edge of the upper portion cover; and
a first link portion detachably linking a rear edge of the front portion cover and a front edge of the rear portion cover with each other;
wherein the first link portion contacts with the lower portion pad.

Advantageous Effects of Invention

According to the vehicle seat of a first aspect, the first link portion detachably linking a rear edge of the front portion cover and a front edge of the rear portion cover with each other contacts with the lower portion pad. Thereby, since the first link portion is made stable by the lower portion pad, the front portion cover and the rear portion cover can be easily linked. Therefore, the cover can be easily attached to the cushion pad.

According to the vehicle seat of a second aspect, a left portion cover extends to the rear surface side of the seat cushion from a left edge of the upper portion cover. A right portion cover extends to the rear surface side of the seat cushion from a right edge of the upper portion cover. Side edges of the left portion cover and the rear portion cover are detachably linked with each other through a second link portion. Side edges of the right portion cover and the rear portion cover are detachably linked with each other through a third link portion. A slit is respectively formed between the side edges of the right portion cover and the left portion cover and the side edges of the rear portion cover behind the second link portion and the third link portion. The support leg penetrates the slit, therefore the cover can be detached without interfering with the support leg. As a result, in addition to effect of the first aspect, detachment of the cover can be easily done.

According to the vehicle seat of a third aspect, the extending portion to reinforce edges of the slit is integrally formed with the second link portion and the third link portion, respectively. Thereby, it is not necessary to separately provide members to reinforce the slit, thus increase of number of parts can be avoided. Therefore, in addition to effect of the second aspect, the slit can be reinforced while avoiding increase of number of parts.

The seat cushion of the vehicle seat according to a fourth aspect includes a rotation shaft rotatably supporting a rear end of the frame, against the floor surface, from a sitting state in which an occupant sits down to a standing state in which a front end of the seat cushion is bounced up. The cushion pad has a pair of side portion pads protruding to a rear surface side than the upper portion pad. The support leg is rotatably supported in the frame through the leg rotation shaft arranged between the pair of side pads and parallel with the rotation shaft. The slit is formed to a rear end of the seat cushion. Therefore, in the standing state of the seat cushion, the support leg is rotated around the leg rotation shaft and the support leg can be stored between the pair of side portion pads. Thereby, since it can be restrained that the support leg protrudes from the rear surface of the seat cushion in the standing state of the seat cushion, interior space can be widened.

The space to store the support leg is formed between the rear portion cover and the cushion pad (a pair of side pads). Since the first link portion contacts with the lower portion pad, the front portion cover and the rear portion cover can be easily linked even in a state that the space to store the support leg exists. Therefore, in addition to the effect of the second aspect or third aspect, the cover can be easily attached to the cushion pad even in a state that the space to store the support leg exists, while widening interior space in the standing state of the seat cushion.

BRIEF DESCRIPTION OF DRAWINGS

FIG. 5 (b) is a sectional view of a second engagement portion sectioned along a Vb-Vb line in FIG. 4.

FIG. 6 (b) is a bottom view of the seat cushion in the standing state.

DESCRIPTION OF EMBODIMENTS

Figure 1:
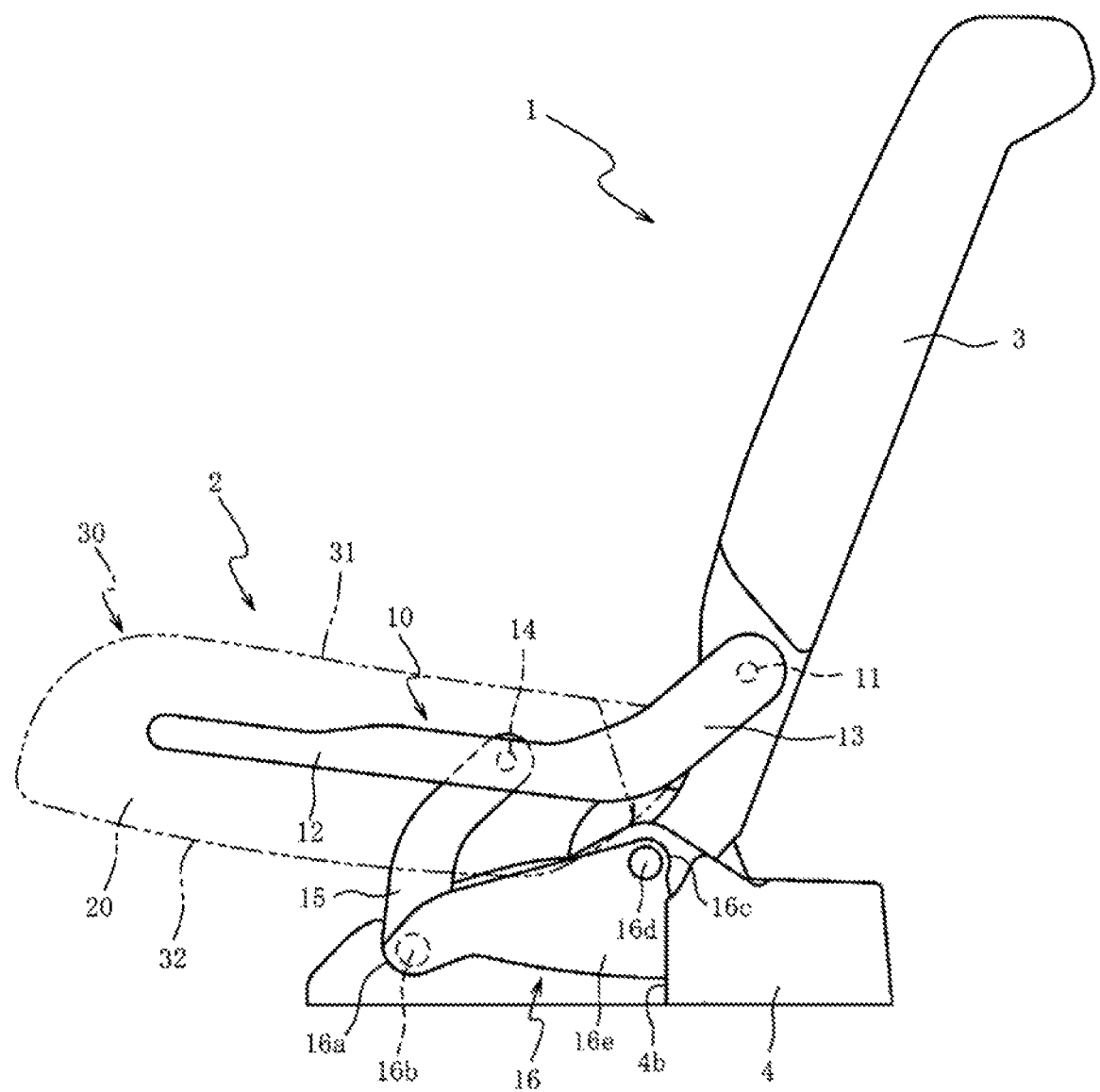
FIG. 1 is a side view of a vehicle seat in a sitting state, according to one embodiment of the present invention.
Figure 2:
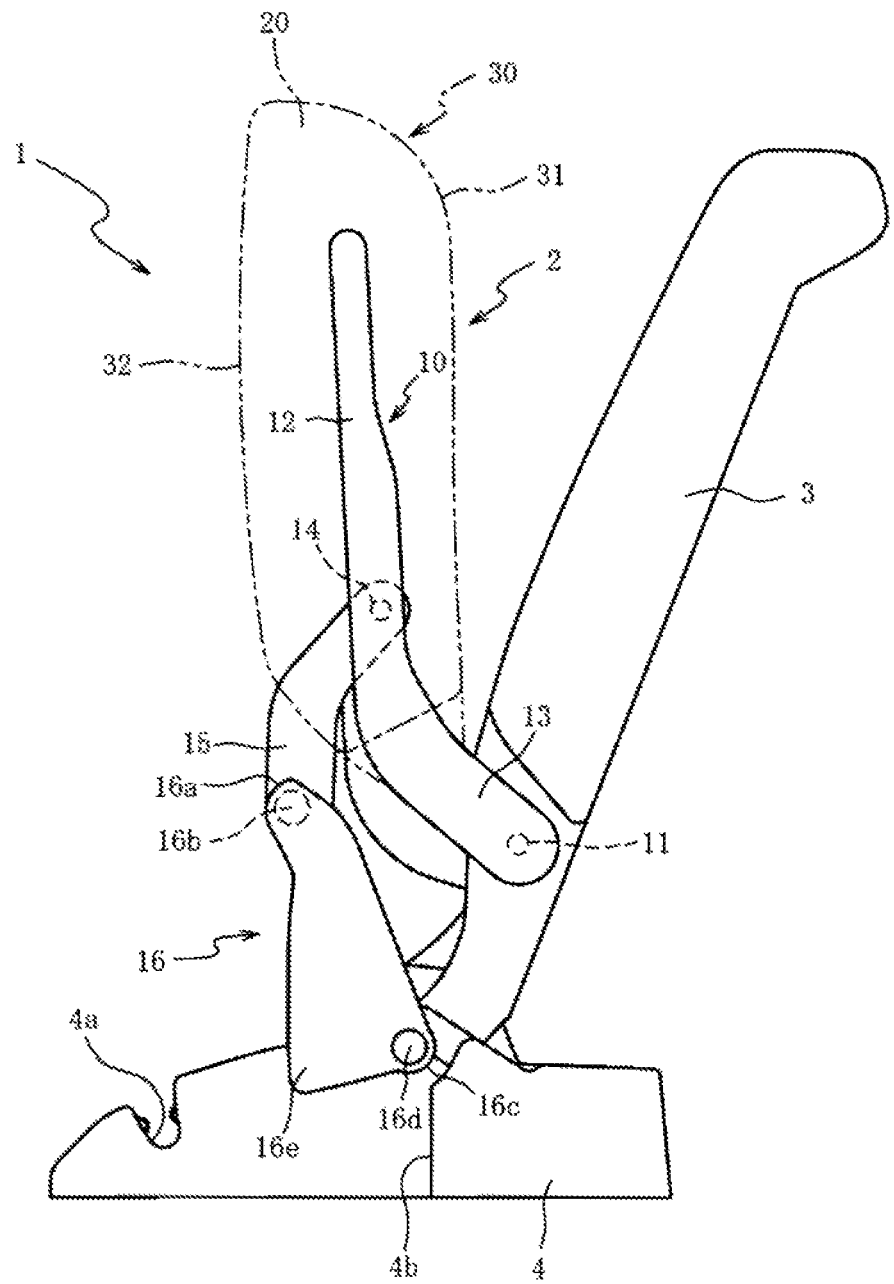
FIG. 2 is a side view of the vehicle seat in a standing state.

Hereinafter, a preferable embodiment of the present invention will be described with reference to the attached drawings. First, a vehicle seat 1 in the one embodiment of the present invention will be described with reference to FIGS. 1 and 2. FIG. 1 a side view of the vehicle seat 1 in a sitting state that an occupant can sit down, according to the one embodiment of the present invention. FIG. 2 is a side view of the vehicle seat 1 in a standing state. In FIGS. 1 and 2, a cover 30 of a seat cushion 2 is indicated by a two-dot chain line.

As shown in FIG. 1, the vehicle seat 1 is a seat mounted in an automobile. The vehicle seat 1 includes a seat cushion 2, a seatback 3 and a base 4. The seatback 3 is arranged at a rear end of the seat cushion 2. To the base 4 mounted on a floor surface of vehicle, a lower end of the seatback 3 is supported. In a case that an occupant sits down on a surface of the seat cushion 2 (upper side surface of sheet plane in FIG. 1), the seatback 3 becomes a backrest of the occupant.

The seat cushion 2 includes a frame 10, a cushion pad 20 and a cover 30. The seat cushion 2 is formed by covering the cushion pad 20 supported on the frame 10 through the cover 30. Here, similarly to the seat cushion 2, the seatback 3 is formed by covering the pad supported on the frame through the cover.

The cover 30 is a soft member mainly constituted from fabric, synthetic leather or leather and the like. The cover 30 includes an upper portion cover 31 and a lower portion cover 32. The upper portion cover 31 is provided on an upper surface of the seat cushion 2. Here, the upper portion cover 31 covers not only the upper surface of the cushion pad 20 but also both a front end surface and a side surface of the cushion pad 20. The lower portion cover 32 is provided on a lower surface of the seat cushion 2 while extending from an edge of the upper portion cover 31.

The frame 10 is a member made of steel. The frame 10 is rotatably supported to the seatback 3 through a rotation shaft 11. The frame 10 includes a frame portion 12 and a frame support portion 13. The frame portion 12 is a portion with a substantial rectangular frame shape in a plan view. The frame portion 12 supports the cushion pad 20 from a lower surface side (lower side of sheet plane in FIG. 1). In the frame portion 12, springs (not shown) for supporting the cushion pad 20 from the lower surface side are bridged over in the forward and backward direction.

The frame support portion 13 is a portion protruding outward from the right and left both sides of a rear end of the seat cushion 2 and extends from a rear end of the frame portion 12 (right end of sheet plane in FIG. 1). The frame support portion 13 supports the frame portion 12 to the seatback 3. An end portion of the frame support portion 13 separate from the frame portion 12 is rotatably supported to the seatback 3 through the rotation shaft 11. Thereby, the frame 10 can rotate around the rotation shaft 11 as a rotation center. Although details will be described hereinafter, a state that the frame 10 is rotated around the rotation shaft 11 is a standing state of the seat cushion 2. In this standing state, the frame support portion 13 is formed so as to curve upward against a surface of the seat cushion 2 from the rear end of the seat cushion 2, so that the frame support portion 13 does not interfere with the seatback 3 and a front end of the seat cushion 2 positions at a desirable height.

To the frame portion 12, an upper end of a support leg 15 is rotatably supported by a leg rotation shaft 14 parallel with the rotation shaft 11. The support leg 15 has a pair of right and left steel members supporting the frame 10 against the floor surface. The support leg 15 regulates rotation of the frame 10 which is rotatable around the rotation shaft 11. A lower end of the support leg 15 is detachably fixed in a support leg detachable portion 4a (see FIG. 2) of the base 4.

The lower end of the support leg 15 and the base 4 are linked by a link 16. The link 16 is a member made of steel. A first end 16a of the link 16 is rotatably supported to the lower end of the support leg 15 by a first link shaft 16b. At a side position where the seatback 3 is supported to the base 4, a second end 16c of the link 16 is rotatably supported to the base 4 by a second link shaft 16d.

The link 16 includes a link protrusion portion 16e protruding downward from a second end 16c side. The link protrusion portion 16e contacts with stoppers 4b protruding from both sides of the base 4, in the sitting state of the seat cushion 2. That is, rotation of the link 16 around the second link shaft 16d is limited by the stoppers 4b.

In the vehicle seat 1, the seat cushion 2 can be made in the standing state shown in FIG. 2 by bouncing up the front end of the seat cushion 2 from the state shown in FIG. 1 in which the occupant sits down. In detail, first, the occupant lifts up the front end of the seat cushion 2 in the sitting down state and detaches the support leg 15 from the support leg detachable portion 4a. Based on that the support leg 15 is detached from the support leg detachable portion 4a, the support leg 15 is made rotatable around the leg rotation shaft 14. Further, the front end of the seat cushion 2 is lifted up and the seat cushion 2 is rotated around the rotation shaft 11, thereby the seat cushion 2 can be made in the standing state from the sitting state.

The lower end of the support leg 15 and the base 4 are linked by the link 16. Thus, corresponding to bouncing up of the seat cushion 2, the support leg 15 is rotated around the leg rotation shaft 14 so that the lower end of the support leg 15 faces for the rear end of the seat cushion 2. In the standing state shown in FIG. 2, the support leg 15 is stored inside of the seat cushion 2 to an extent that the support leg 15 does not protrude from the rear surface of the seat cushion 2.

Figure 3:
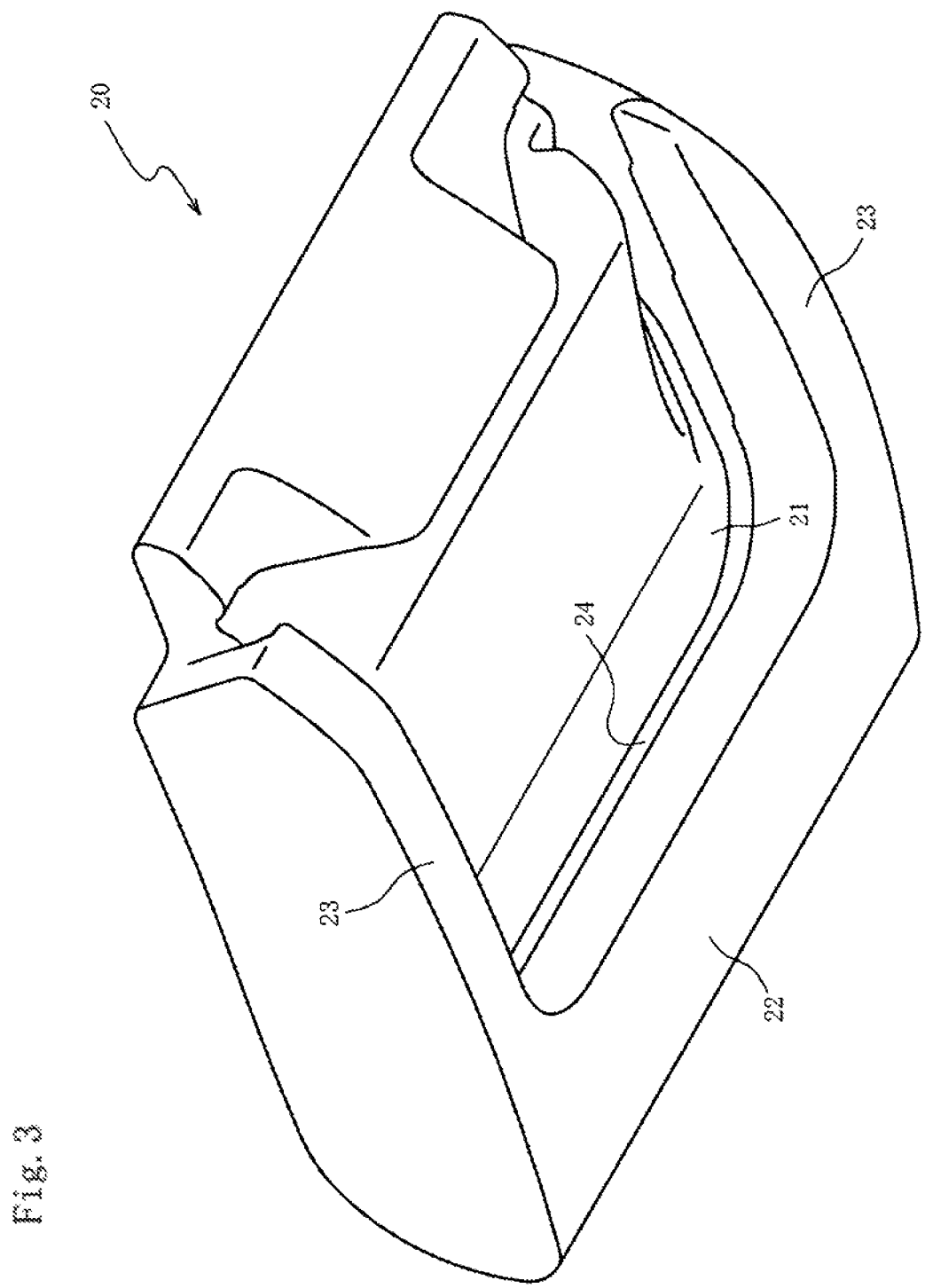
FIG. 3 is a lower perspective view of a cushion pad.

Further, the cushion pad 20 will be described with reference to FIG. 3. FIG. 3 is a lower perspective view of a cushion pad 20. As shown in FIG. 3, the cushion pad 20 is a member formed from foaming synthetic resin such as elastic soft polyurethane foam and the like. The cushion pad 20 includes an upper portion pad 21, a lower portion pad 22 and a pair of side portion pads 23. The upper portion pad 21 is a portion constituting an upper surface side of the cushion pad 20 on which the occupant sits down. The lower portion pad 22 is a portion protruding to a lower surface side from the front end side of the upper portion pad 21. A pair of the side portion pad 23 are portions respectively protruding to the lower surface side from the right and let both sides of the upper portion pad 21. In the cushion pad 20, the upper portion pad 21, the lower portion pad 22 and the side portion pads 23 are integrally formed.

At the lower surface side of the cushion pad 20, it is formed a space enclosed by the lower portion pad 22 and the side portion pad 23. In this space, the frame 10 and support leg 15 (see FIG. 1) are arranged. In the cushion pad 20, it is formed a groove portion 24 over a border of the upper portion pad 21, the lower portion pad 22 and the side portion pads 23. The frame portion 12 of the frame 10 is fitted in this groove portion 24, thereby the cushion pad 20 is fixed to the frame 10. Here, in other words, an upper surface side of the cushion pad 20 than the groove portion 24 (frame 10) is the upper portion pad 21. Further, a lower surface side of the cushion pad 20 than the groove portion 24 (frame 10) is the lower portion pad 22 and the side portion pad 23.

Figure 4:
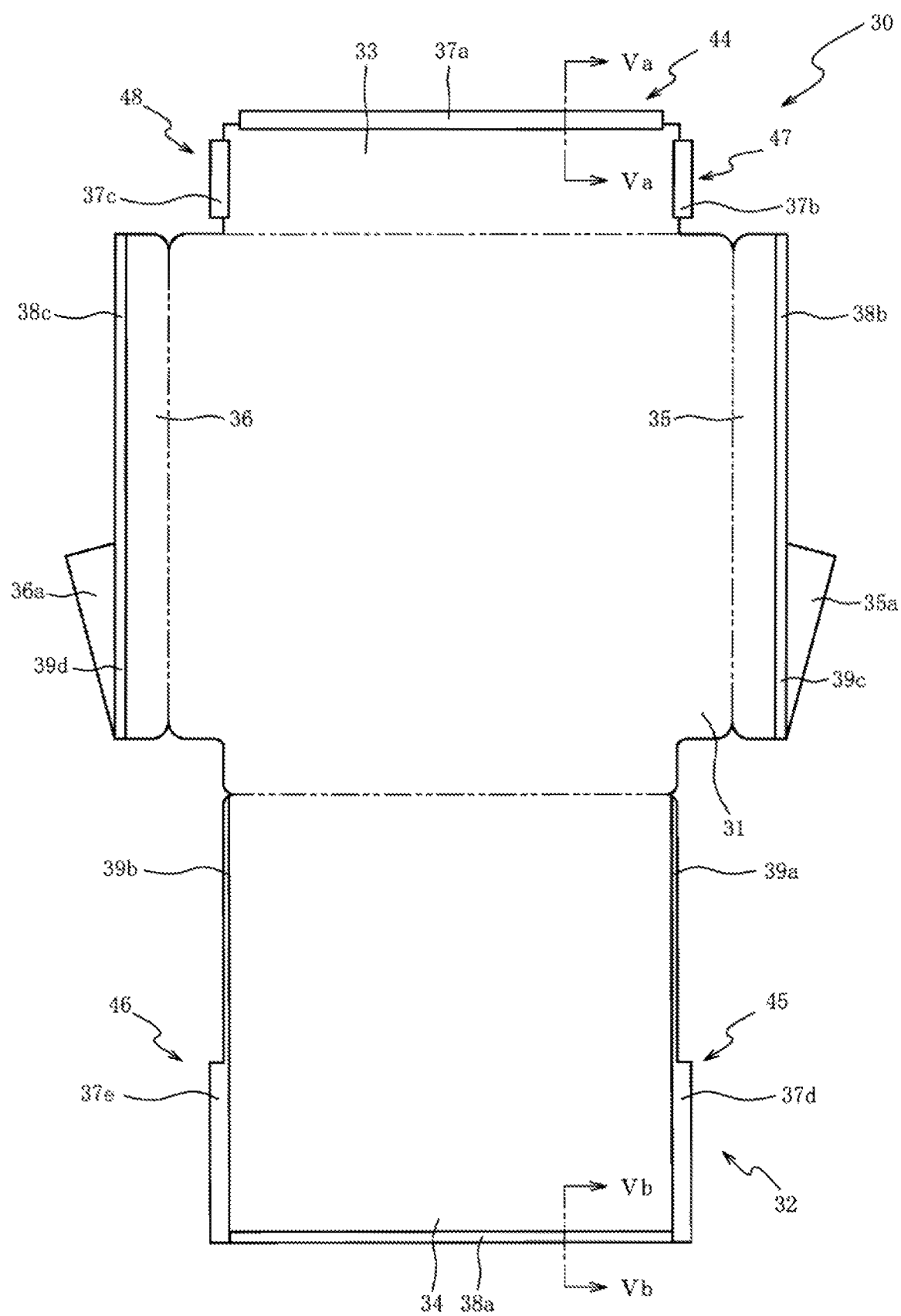
FIG. 4 is a schematic development view of a cover.
Figure 5A:
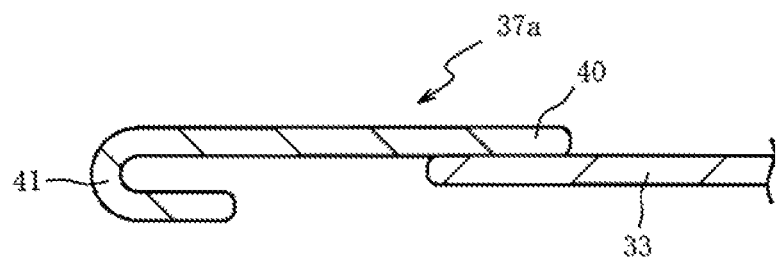
FIG. 5 (a) is a sectional view of a first engagement portion sectioned along a Va-Va line in FIG. 4.
Figure 5B:
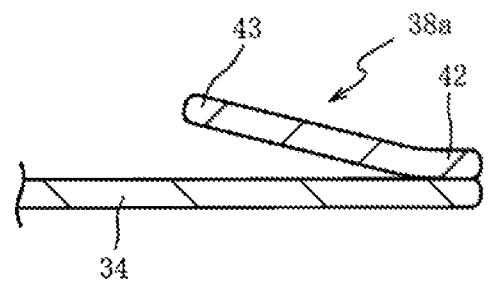

Further, the cover 30 will be described with reference to FIGS. 4, 5(a) and 5(b). FIG. 4 is a schematic development view of the cover 30. FIG. 5 (a) is a sectional view of a first engagement portion 37a sectioned along a Va-Va line in FIG. 4. FIG. 5 (b) is a sectional view of a second engagement portion 38a sectioned along a Vb-Vb line in FIG. 4. Here, FIG. 4 is a view when seen from the lower surface side of the cover 30 and a border of the upper portion cover 31 and the lower portion cover 32 is indicated by a two-dot chain line.

As shown in FIG. 4, the lower portion cover 32 of the cover 30 includes a front portion cover 33, a rear portion cover 34, a left portion cover 35 and a right portion cover 36. The front portion cover 33 is a portion extending from a front edge of the upper portion cover 31. The rear portion cover 34 is a portion extending from a rear edge of the upper portion cover 31. The left portion cover 35 is a portion extending from a left edge of the upper portion cover 31. The right portion cover 36 is a portion extending from a right edge of the upper portion cover 31. The upper portion cover 31, the front portion cover 33, the rear portion cover 34, the left portion cover 35 and the right portion cover 36 (hereinafter, called as each portion of the lower portion cover 32) are integrally sewn together.

In a case that the cushion pad 20 is covered by the cover 30, each portion of the lower portion cover 32 is folded back toward a center of the sheet plane in FIG. 4 and each portion extends to the lower surface side of the seat cushion 2. Therefore, an upper side edge of the sheet plane in FIG. 4 of the front portion cover 33 will be described as a rear edge. Further, a lower side edge of the sheet plane in FIG. 4 of the rear portion cover 34 will be described as a front edge.

At the rear edge and the both side edges of the front portion cover 33 and at a front edge side of both side edges of the rear portion cover 34, a first engagement portions 37a, 37b, 37c, 37d and 37e are respectively provided over their edges. At a front edge of the rear portion cover 34, a side edge of the left portion cover 35 and a side edge of the right portion cover 36, a second engagement portions 38a, 38b and 38c are respectively provided over their edges.

At the side edge of the rear portion cover 34, extending portions 39a, 39b integrally formed with respective first engagement portions 37d, 37c are provided. The extending portions 39a, 39b are formed from the first engagement portions 37d, 37c to the upper portion cover 31. The first engagement portions 37a, 37b, 37c, 37d, 37e, the second engagement portions 38a, 38b, 38c and the extending portions 39a, 39b are flexible members made of synthetic resin and are sewn to each portion of the lower portion cover 32.

At a rear edge side of a side edge of the left portion cover 35 (rear portion cover 34 side) and a rear edge side of a side edge of the right portion cover 36, protrusive portions 35a, 36a are protruded more outward than the second engagement portions 38b, 38c. The protrusive portions 35a, 36a are constituted from the same material as the left portion cover 35 and the right portion cover 36. The protrusive portions 35a, 36a are sewn to side edges of the left portion cover 35 and the right portion cover 36. In a case that the cushion pad 20 is covered by the cover 30, the protrusive portion 35a, 36a wraps the second engagement portions 38b, 38c and the protrusive portions 35a, 36a enter into an inner side of the cover 30.

As shown in FIG. 5(a), the first engagement portion 37a includes a first end portion 40 and a second end portion 41. The first end portion 40 is sewn to a surface of the cushion pad 20 side of the front portion cover 33. The second end portion 41 is formed into a hook shape. In the first engagement portion 37a, the second end portion 41 with a hook shape is protruded outside from the rear edge of the front portion cover 33. Here, each of the first engagement portions 37b, 37c, 37d, 37e is constituted substantially as same as the first engagement portion 37a. The first end portion 40 of the first engagement portion 37b, 37c, 37d, 37e are respectively sewn to the both side edges of the front portion cover 33, the both side edges of the rear portion cover 34.

As shown in FIG. 5(b), in the second engagement portion 38a, only a first end portion 42 is sewn to a surface of the cushion pad 20 side of the rear portion cover 34 while an edge of the first end portion 42 is coincided with a front edge of the rear portion cover 34. A second end portion 43 of the second engagement portion 38a is made free against the rear portion cover 34. Here, the second engagement portions 38b, 38c are constituted as same as the second engagement portion 38a. The first end portions 42 of the second engagement portion 38b, 38c are respectively coincided with the side edge of the left portion cover 35, the side edge of the right portion cover 36 and are sewn thereto.

The front portion cover 33 and the rear portion cover 34 are folded back so as to mutually face, thereafter the second end portion 43 of the second engagement portion 38a is inserted in the second end portion 41 of the first engagement portion 37a. Thereby, the rear edge of the front portion cover 33 and the front edge of the rear portion cover 34 are linked. The first engagement portion 37a and the second engagement portion 38a, which detachably link the rear edge of the front portion cover 33 and the front edge of the rear portion cover 34, become a first link portion 44.

Further, the first engagement portion 37d and the second engagement portion 38b, which detachably link the side edge of the rear portion cover 34 and the side edge of the left portion cover 35, become a second link portion 45. The first engagement portion 37e and the second engagement portion 38c, which detachably link the side edge of the rear portion cover 34 and the side edge of the right portion cover 36, become a third link portion 46. The first engagement portion 37b and the second engagement portion 38b, which detachably link the side edge of the front portion cover 33 and the side edge of the left portion cover 35, become a fourth link portion 47. The first engagement portion 37c and the second engagement portion 38c, which detachably link the side edge of the front portion cover 33 and the side edge of the right portion cover 36, become a fifth link portion 48.

Figure 6A:
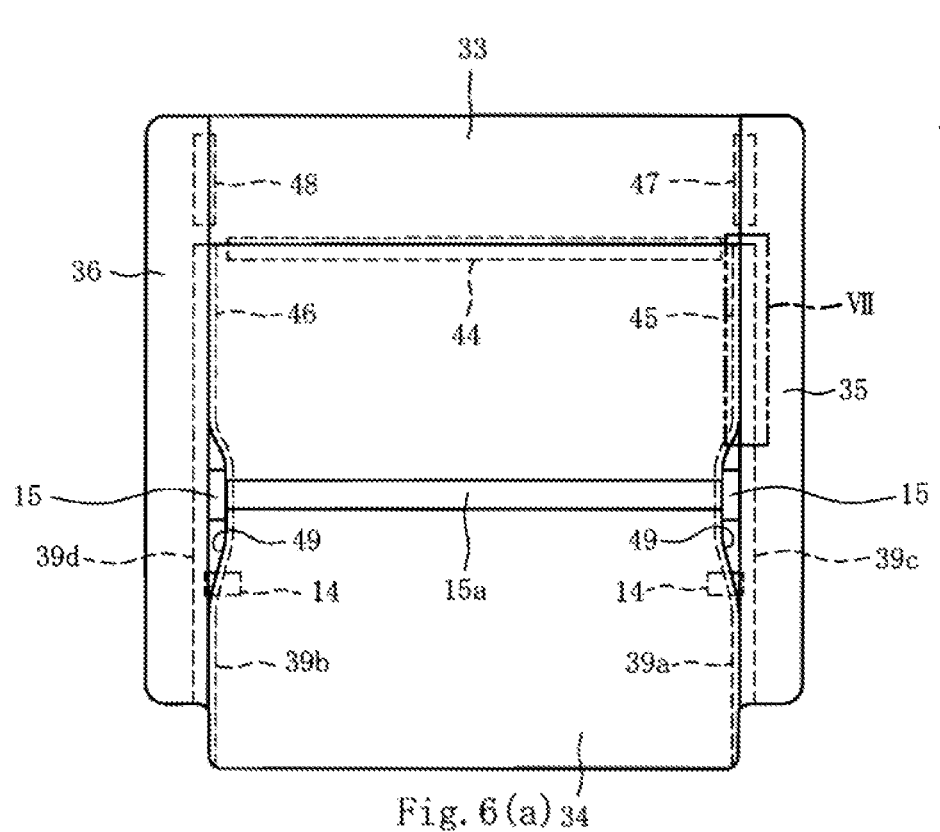
FIG. 6 (a) is a bottom view of a seat cushion in the sitting state that an occupant can sit down.
Figure 6B:
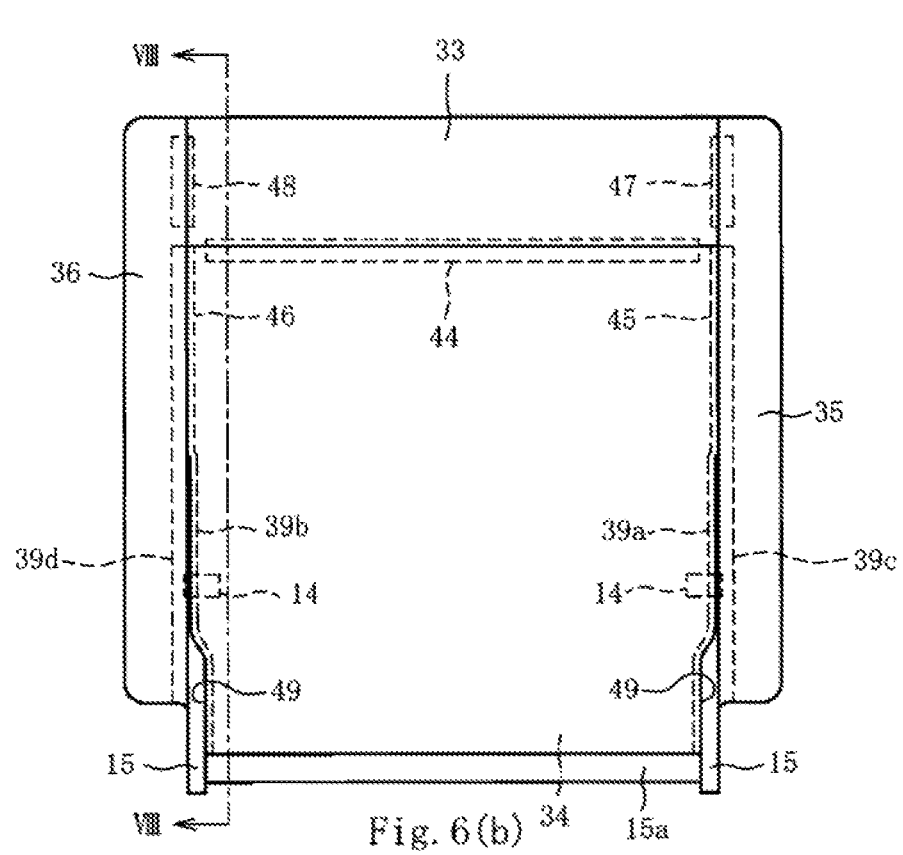
Figure 7:
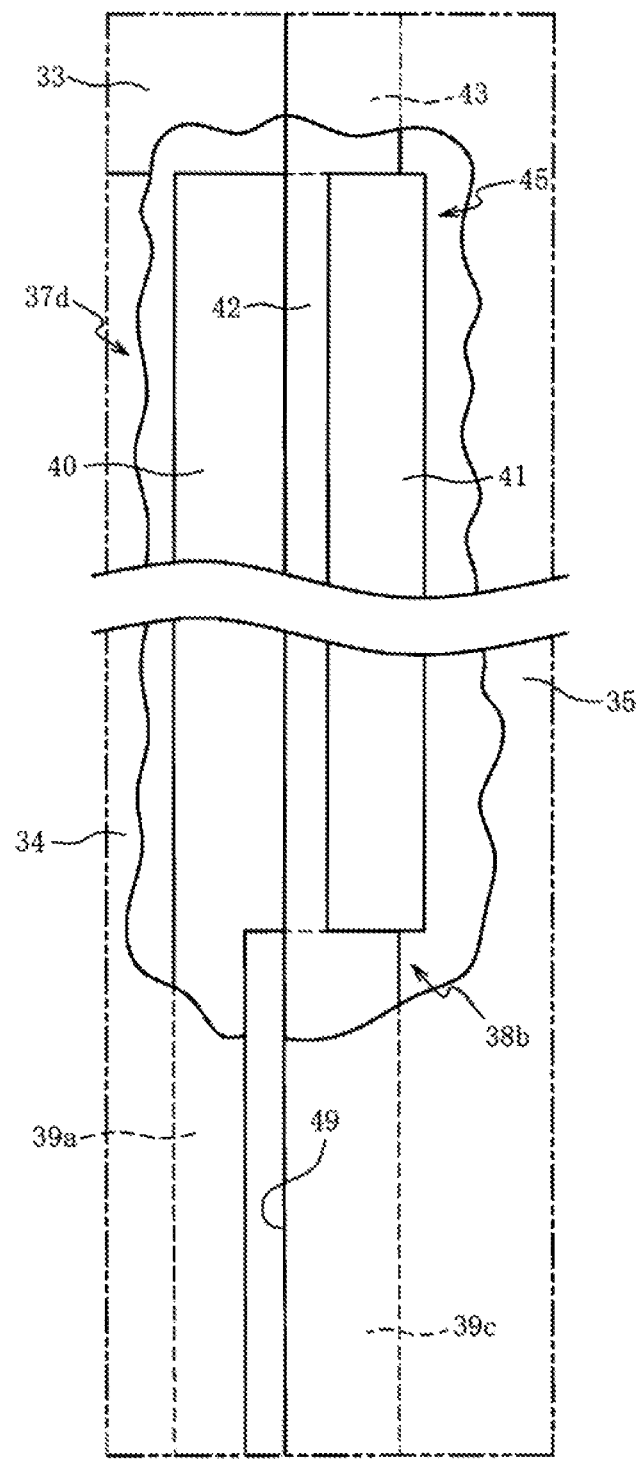
FIG. 7 is a partial enlarged view of the seat cushion in a VII portion of FIG. 6 (a).
Figure 8:
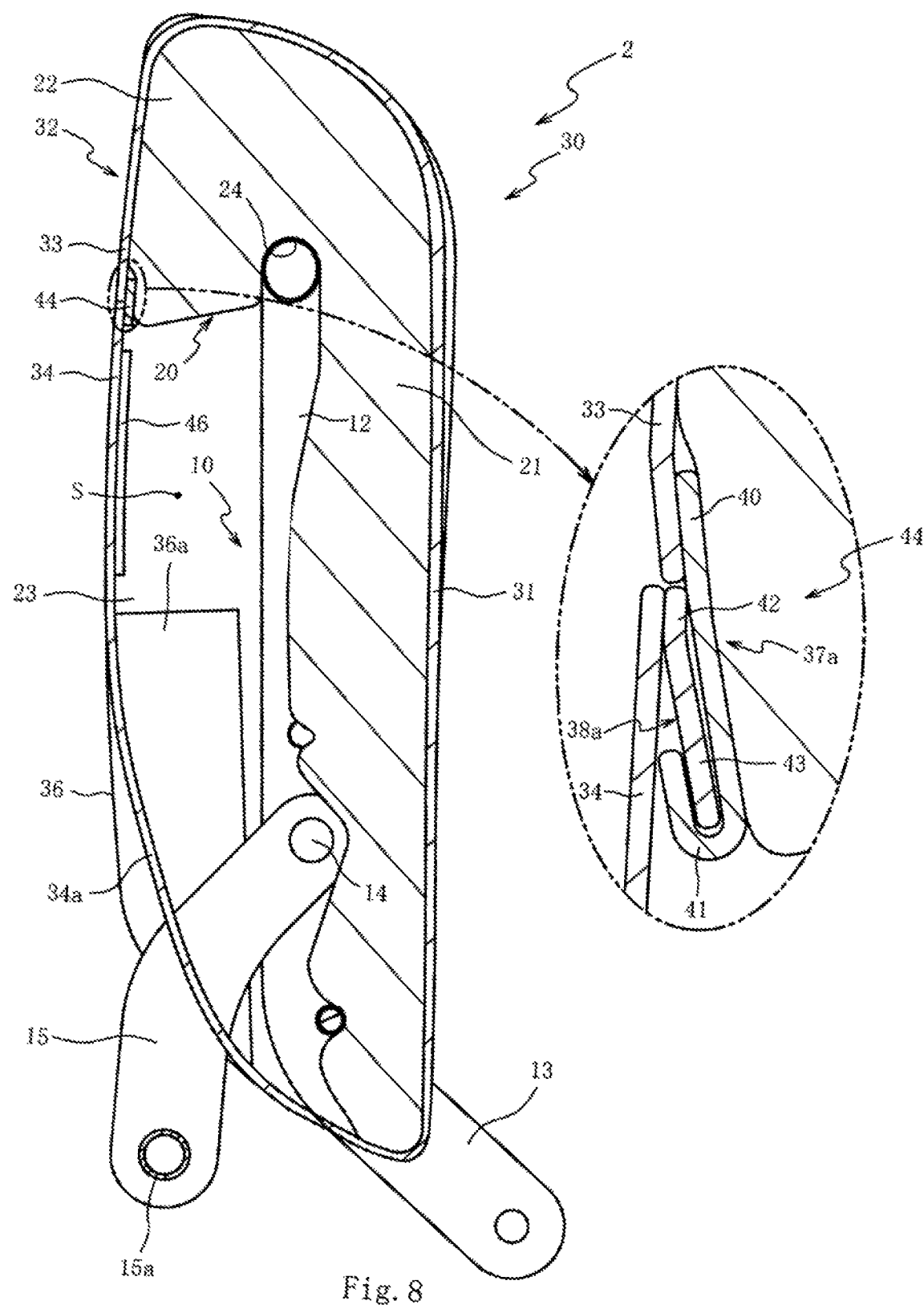
FIG. 8 is a sectional view of the seat cushion sectioned along a VIII-VIII line in FIG. 6 (b).

Function of the cover 30 will be described with reference to FIG. 6(a) to FIG. 8. FIG. 6 (a) is a bottom view of the seat cushion 2 in the sitting state. FIG. 6 (b) is a bottom view of the seat cushion 2 in the standing state. FIG. 7 is a partial enlarged view of the seat cushion 2 in a VII portion of FIG. 6 (a). And FIG. 8 is a sectional view of the seat cushion 2 sectioned along a VIII-VIII line in FIG. 6 (b). Here, in FIG. 6(a) and FIG. 6(b), indication of the frame support portion 13 is omitted. In FIG. 7, the second link portion 45 is indicated under a state that a part of the lower portion cover 32 is ruptured and indication of center of the second link portion 45 is omitted. In FIG. 8, the third link portion 46 is schematically indicated.

Under a state that the surface of the cushion cover 20 is covered by the upper portion cover 31, as shown in FIG. 6 (a), each part of the lower portion cover 32 is linked by each of the link portions 44, 45, 46, 47 and 48. Thereby, the cushion pad 20 is covered by the cover 30. At that time, a size of each portion of the lower portion cover 32 against the cushion pad 20 is set so that a predetermined tension occurs in each portion of the lower portion cover 32 in a direction that portions of the lower portion cover 32 adjacent thereto mutually separates. Thereby, the second engagement portions 38a, 38b, 38c can be made difficult to get out from the first engagement portions 37a, 37b, 37c, 37d, 37e. As a result, it can be restrained that link through each link portion 44, 45, 46, 47, 48 is unexpectedly got out.

As shown in FIG. 7, the first engagement portion 37d and the second engagement portion 38b of the second link portion 45 mutually engages. In this case, a slit 49 is formed between the extending portion 39a integrally formed with the first engagement portion 37d and the second engagement portion 38b. In the second engagement portion 38b, a portion opposing to the extending portion 39a is made an extending portion 39c. That is, the slit 49 is formed between the extending portions 39a, 39c which are integrally formed with the second link portion 45 (first engagement portion 37d and the second engagement 38b).

Description returns to FIG. 6(a). The first engagement portion 37e and the second engagement portion 38c of the third link portion 46 mutually engages. In this case, similar to the above, a slit 49 is formed between the extending portion 39b integrally formed with the first engagement portion 37e and the extending portion 39d being a portion to which the extending portion 39b in the second engagement portion 38c opposes. That is, the slit 49 is formed between the extending portions 39b 39d integrally formed with the third link portion 46.

As mentioned, the slit 49 is formed in a portion that the side edges of the rear portion cover 34 and the side edges of the left portion cover 35 and the right portion cover 36 are not mutually linked. The extending portions 39a, 39b, 39c, 39d are respectively formed at both side edges of the rear portion cover 34, the side edges of the left portion cover 35 and the right portion cover 36. That is, the slits 49 are respectively formed between both side edges of the rear portion cover 34, the side edges of the left portion cover 35 and the right portion cover 36 and an edge of the slit 49 is reinforced by each of the extending portions 39a, 39b, 39c, 39d.

By covering the cushion pad 20 through the cover 30, the support leg 15 penetrates the slit 49 corresponding to the portion that the rear portion cover 34, the left portion cover 35 and the right portion cover 36 are not mutually linked. Thereby, the support leg 15 protrudes from the rear surface of the cushion pad 20. That is, the slit 49 in which the support leg 15 penetrates is formed between the side edge of the rear portion cover 34 and the side edges of the left portion cover 35 and the right portion cover 36 behind the second link portion 45 and the third link portion 46. Therefore, the cover 30 can be detached without interfering with the support leg 15. As a result, attachment and detachment of the cover 30 can be easily conducted.

To lower ends of a pair of support legs 15, it is bridged over a lower end rod 15a for detaching the support leg 15 in and from the support leg detachable portion 4a. Since the slit 49 is formed between the side edge of the rear portion cover 34 and the side edges of the left portion cover 35 and the right portion cover 36, the cover 30 can be easily detached in a state that the lower end rod 15a is bridged over to a pair of support legs 15.

Here, a width of the slit 49 (size in the left and right direction) is smaller against a thickness of the support leg 15 (size in the left and right direction). However, since the extending portions 39a, 39b, 39c, 39d constituting edges of the slit 49 have flexibility and the rear portion cover 34, the left portion cover 35 and the right portion cover 36 are soft members, the width of the slit 49 can be enlarged based on deformation thereof. Thus, only the width of the slit 49 in the portion where the support leg 15 penetrates the slit 49 can be enlarged and the width of the slit 49 in the portion other than above portion can be retained smaller. As a result, it can be restrained that dust and the like enter into the cover 30 from the slit 49.

The slit 49 is formed over the extending portions 39a, 39b which extend to the front side cover 31. Therefore, in the state that the cushion pad 20 is covered by the cover 30, the slit 49 is formed to the rear end of the seat cushion 2. Thereby, in a case that the seat cushion 2 is changed to the standing state in FIG. 6(b) from the sitting state in FIG. 6(a), the support leg 15 rotating around the leg rotation shaft 14 can be moved to the rear end of the seat cushion 2 within the slit 49.

The support leg 15 rubs against an edge of the slit 49 (side edges of the rear portion cover 34, the left portion cover 35 and the right portion cover 36) according to movement of the support leg 15. Since the edge of the slit 49 is reinforced by the extending portions 39a, 39b, 39c, 39d, durability of the slit 49 can be improved. The extending portions 39a, 39b, 39c, 39d are integrally formed with the second link portion 45 and the third link portion 46, respectively. Thereby, it is not necessary to separately provide members to reinforce the slit 49, thus increase in the number of parts can be avoided. As a result, durability of the slit 49 can be improved while avoiding increase in the number of parts and reinforcing the slit 49.

As shown in FIG. 8, between a pair of side portion pads 23 in the rear end side than the lower portion pad 22, a predetermined space S is formed between the cushion pad 20 and the cover 30. This space S is provided to easily fit in the cushion pad 20 from the upper surface side of the frame 10. Further, it is omitted the cushion pad 20 to which weight is not added in a case that the occupant sits down on the seat cushion 2 and the space S is provided between a pair of side portion pads 23, thereby material cost can be reduced.

Further, in a case that the seat cushion 2 is made in the standing state, the support leg 15 rotates around the lag rotation shaft 14 arranged between a pair of side portion pads 23 (space S) and the support leg 15 moves within the slit 49 formed to the rear end of the seat cushion 2. Thereby, the support leg 15 can be stored in the pace S. As a result, it can be restrained that the support leg 15 in the standing state of the seat cushion 2 protrudes, therefore interior space can be widened.

In a case that the first link portion 44 linking the rear edge of the front portion cover 33 and the front edge of the rear portion cover 34 positions in the space S between the cushion pad 20 and the cover 30, the first ink portion 44 floats. That is, the first link portion 44 does not contact with the cushion pad 20. In this case, the first link portion 44 does not become stable. Therefore, it becomes difficult that the first engagement portion 37a and the second engagement portion 38a of the first link portion 44 mutually engage. Further, link of the rear edge of the front portion cover 33 and the front edge of rear portion cover 34 by the first link portion 44 becomes difficult.

In the standing state of the seat cushion 2, when the occupant holds hand on the rear surface of the seat cushion 2 or baggage contacts, thereby weight is added to the rear surface of the seat cushion 2, the cover 30 deflects. In a case that the first link portion 44 floats and does not contact with the cushion pad 2, there will be a fear that engagement of the first engagement portion 37a and the second engagement portion 38a is released due to defection of the cover 30. As a result, link of the rear edge of the front portion cover 33 and the front edge of the rear portion cover 34 is unexpectedly released, thus it is very troublesome.

In the present embodiment, it is made the cushion pad 20 to be easily fitted into the frame 10 and the first link portion 44 contacts with the lower portion pad 22 even in a state that it exists the space S to sore the support leg 15. Therefore, the first link portion 44 is made stable by the lower portion pad 22, thus the rear end of the front portion 33 and the front edge of the rear portion cover 34 can be easily linked. Accordingly, the cover 30 can be easily attached to the cushion pad 20 even in s state that the space S exists between the cushion pad 20 and the cover 30.

At the more rear end side of the seat cushion 2 than the third link portion 46, the protrusive portion 36a protruding from the side edge of the right portion cover 36 is arranged between the support leg 15 and the side portion pad 23. Similarly, at the more rear end side of the seat cushion 2 than the second link portion 45, the protrusive portion 35a is arranged between the support leg 15 and the side portion pad 23. Therefore, when the support leg 15 rotates around the leg rotation shaft 14, it can be prevented that the support leg 15 and the side portion pad 23 rub against each other. As a result, durability of the cushion pad 20 can be improved.

The left portion cover 35 and the right portion cover 36 contact with the side portion pad 23 over the front and rear direction, on the contrary, the rear portion cover 34 does not contact with the cushion pad 20. Therefore, a cover recess portion 34a corresponding to a portion the slit 49 in the rear portion cover 34 dents toward the space S against the left portion cover 35 and the right portion cover 36. Although a part of the side portion pad 23 exposes due to difference in level between the left portion cover 35, the right portion cover 36 and the cover recess portion 34a of the rear portion cover 34, it can be realized that the side portion pad 23 is not exposed by the protrusive portions 35a, 36a.

Although the present invention is described based on the embodiment, the present invention is not limited to the above embodiment. It will be easily guessed that various improvements and deformations can be conducted within a scope not deviate concept of the present invention. For example, as for shapes of the frame 10, the cushion pad 20 and the cover 30, only one example is indicated, therefore various shapes thereof can be naturally adopted.

In the above embodiment, although the vehicle seat 1 in which the seat cushion 2 can be bounced up is described, the vehicle seat is not necessarily limited to this. The present invention can be, of course, applied for various vehicle seats in which the seat cushion 2 cannot be bounced up.

In the above embodiment, although it is described the support leg 15 penetrates the slit 49 of the cover 30 and protrudes from the rear surface of the seat cushion 2, the support leg 15 is not necessarily limited to this. It is good that the support leg supports the seat cushion 2 against the floor surface. For example, it can raise the support leg which is protruded from the rear end of the seat cushion 2 and is fixed to the base 4 or the floor surface. Further, it is not limited to the support leg 15 rotating around the leg rotation shaft 14 and it can be, of course, conducted that the support leg is slid to the front and rear direction of the seat cushion 2.

In the above embodiment, although it is described a case that the cushion pad 20 is formed of foaming synthetic resin such as soft polyurethane foam and the like, the cushion pad 20 is not necessarily limited to this. Material of the cushion pad 20 can be changed as appropriate. As for other material than the foaming synthetic resin, for example, it can raise material that fiber such as synthetic resin is hardened (combines) by binder such as urethane and material that fiber of synthetic resin is melted by heat and is mutually welded.

In the above embodiment, although it is described a case that the frame 10 and the support leg 15 is made of steel, they are not necessarily limited to this. It is, of course, possible that metal other than steel or synthetic resin is utilized for the frame 10 and the support leg 15.

In the above embodiment, although it is described a case that in each of the link portions 44, 45, 46, 47, 48, the second engagement portions 38a, 38b, 38c are engaged with the first engagement portions 37a, 37b, 37c, 37d, 37e having hook shapes, such constitution is not necessarily limited to this. Of course, it is possible that each link portion is constituted from a hook-and-loop fastener, a line fastener, a button and the like. Further, it is not limited to a case that the first engagement portions 37a, 37b, 37c, 37d, 37e and the second engagement portions 38a, 38b, 38c are provided over the edge of each portion of the lower portion cover 32. It is possible that the first engagement portion and the second engagement portion are intermittently provided on the edge of each portion of the lower portion cover 32.

Further, although it is described a case that the first engagement portions 37a, 37b, 37c, 37d, 37e and the second engagement portions 38a, 38b, 38c are members made of flexible synthetic resin, it is, of course, possible to constitute the first engagement potion and the second engagement portion from synthetic resin or metal without flexibility. Here, in a case that the second link potion 45 and the third link portion 46 have no flexibility, the extending portions 39a, 39b, 39c, 39d integrally formed with the second link portion 45 and the third link portion 46 has also no flexibility. Therefore, it is necessary to enlarge the width of the slit 49 formed between the extending portions 39a, 39b, 39c, 39d than the thickness of the support leg 15.

In the above embodiment, although it is described a case that the edges of the upper portion cover 31 and each portion of the lower portion cover 32 are mutually sewn together and formed into one body, the constitution is not necessarily limited to this. It is, of course, possible that the upper portion cover 31 and each portion of the lower portion cover 32 are adhered or welded. Further, it is possible that the upper portion cover 31 and each portion of the lower portion cover 32 are integrally formed from one sheet of fabric or synthetic leather or leather and the like.

In the above embodiment, although it is described a case that the front portion cover 33 and the left portion cover 35 are linked by the fourth link portion 47 and the front portion cover 33 and the right portion cover 36 are linked by the fifth link portion 48, the constitution is not necessarily limited to this. It is, of course, possible that, by omitting the fourth link portion 47 and the fifth link portion 48, the side edge of the front portion cover 33 and the side edges of the left portion cover 35 and the right portion cover 36 are sewn together or adhered or welded, thereby are formed into one body.

In the above embodiment, although it is described a case that the lower portion cover 32 is divided into four in front to back, left and right and becomes the front portion cover 33, the rear portion cover 34, the left portion cover 35 and the right portion cover 36, the constitution is not necessarily limited to this. It is, of course, possible that the lower portion cover 32 is divided into two in front to back direction and is made into the front portion cover and the rear portion cover. In this case, it is possible that the side edges of the front portion cover and the rear portion cover and the side edge of the upper portion cover 31 are detachably linked with each other.

In the above embodiment, although it is described a case that the frame 10 is rotatably supported to the seatback 3 through the rotation shaft 11, the constitution is not necessarily limited to this. It is, of course, possible that the frame 10 is rotatably supported to the base 4 through the rotation shaft 11.

The invention claimed is:

1.
A vehicle seat comprising:
a frame supported by a support leg against a floor surface;
a cushion pad supported to the frame each portion of the cushion pad being integrally formed as on piece:
a seat cushion having a cover covering the cushion pad; and
a seatback arranged at a rear end of the seat cushion;
wherein the cushion pad comprises:
an upper portion pad provided at an upper surface side of the frame; and
a lower portion pad provided at a front end side of a lower surface side of the frame;
wherein the cover comprises:
an upper portion cover provided on an upper surface side of the seat cushion;
a front portion cover extending to a rear surface side of the seat cushion from a front edge of the upper portion cover;
a rear portion cover extending to the rear surface side of the seat cushion from a rear edge of the upper portion cover; and
a first link portion comprising front or rear engagement portions detachably linking a rear edge of the front portion cover and a front edge of the rear portion cover with each other, wherein the rear engagement portion is arranged forward more than half a distance from the rear edge of the upper portion cover to the front edge of the upper portion cover;
wherein the first link portion contacts the lower portion pad at a position in which the front and rear engagement portiond engage each other.

2.
The vehicle seat according to claim 1, wherein the cover comprises;
a left portion cover extending to the rear surface side of the seat cushion from a left edge of the upper portion cover;
a right portion cover extending to the rear surface side of the seat cushion from a right edge of the upper portion cover;
a second link portion detachably linking side edges of the left portion cover and the rear portion cover with each other;
a third link portion detachably linking side edges of the right portion cover and the rear portion cover; and
a slit respectively formed between the side edges of the right portion cover and the left portion cover and the side edges of the rear portion cover behind the second link portion and the third link portion;
wherein the support leg penetrates the slit.

3.
The vehicle seat according to claim 2, wherein the cover has an extending portion integrally formed with the second link portion and the third link portion, respectively, the extending portion reinforcing edges of the slit.

4.
The vehicle seat according to claim 2, wherein the cushion pad has a pair of side portion pads protruding to a rear surface side of the upper portion pad from left and right both sides of the upper portion pad, and
wherein the seat cushion comprises:
frame a rotation shaft rotatably supporting a rear end of the frame, against the floor surface, from a sitting state in which an occupant sits down to a standing state in which a front end of the seat cushion is bounced up: and
a leg rotation shaft rotatably supporting the support leg to the frame and arranged between the pair of side pads and parallel with the frame rotation shaft;
wherein the slit is formed to a rear end of the seat cushion.

* * * * *